(12) United States Patent
Wegener

(10) Patent No.: US 8,456,873 B2
(45) Date of Patent: Jun. 4, 2013

(54) METHOD AND APPARATUS FOR A POWER CONVERSION DEVICE

(75) Inventor: Rudolf Wegener, Grenoble (FR)

(73) Assignee: Hewlett-Packard Development Company, L.P., Houston, TX (US)

(*) Notice: Subject to any disclaimer, the term of this patent is extended or adjusted under 35 U.S.C. 154(b) by 0 days.

(21) Appl. No.: 12/680,091

(22) PCT Filed: Aug. 14, 2008

(86) PCT No.: PCT/US2008/009816
§ 371 (c)(1),
(2), (4) Date: Mar. 25, 2010

(87) PCT Pub. No.: WO2009/032061
PCT Pub. Date: Mar. 12, 2009

(65) Prior Publication Data
US 2011/0110131 A1    May 12, 2011

(30) Foreign Application Priority Data

Aug. 28, 2007 (EP) .................................... 07291045

(51) Int. Cl.
*H02H 7/00* (2006.01)
(52) U.S. Cl.
USPC ............................................................ 363/51
(58) Field of Classification Search
USPC ................ 363/51, 52, 53, 84, 85, 88, 89, 90, 363/95, 96, 97
See application file for complete search history.

(56) References Cited

U.S. PATENT DOCUMENTS

| | | | |
|---|---|---|---|
| 5,615,097 A | 3/1997 | Cross | |
| 5,644,214 A | 7/1997 | Lee | |
| 5,708,574 A * | 1/1998 | Crompton | 363/53 |
| 5,818,708 A * | 10/1998 | Wong | 363/89 |
| 6,185,082 B1 | 2/2001 | Yang | |
| 6,891,425 B1 | 5/2005 | Huynh | |
| 7,180,273 B2 | 2/2007 | Bocchiola et al. | |
| 7,489,120 B2 * | 2/2009 | Matthews | 323/284 |
| 2002/0006045 A1 * | 1/2002 | Shirai et al. | 363/17 |
| 2003/0035311 A1 * | 2/2003 | Phadke | 363/89 |
| 2005/0002211 A1 * | 1/2005 | Lee et al. | 363/44 |
| 2005/0270813 A1 * | 12/2005 | Zhang et al. | 363/89 |
| 2008/0013343 A1 * | 1/2008 | Matthews | 363/16 |

FOREIGN PATENT DOCUMENTS

| | | |
|---|---|---|
| AT | 399067 | 3/1995 |
| EP | 00436980 A | 7/1991 |
| KR | 2002-66881 A | 8/2002 |
| WO | WO96/09676 a | 3/1996 |
| WO | WO99/32953 | 7/1999 |

OTHER PUBLICATIONS

ISA, International Search Report and Written Opinion, App No. PCT/US2008/009816, Feb. 25, 2009 (pp. 1-11).
EPO, EP Patent Search Report, App No. 07291045.8-2007, Mar. 12, 2008 (pp. 1-13).
Rudolf Wegener, SIPO, First Office Action dated Apr. 17, 2012, CN Pat App No. 200880113443.4 filed Mar. 22. 2010.

* cited by examiner

*Primary Examiner* — Nguyen Tran

(57) ABSTRACT

There is provided an apparatus and methods for a power conversion device. The method includes rectifying a mains voltage to produce a dc voltage and placing the dc voltage on a bus. The bus is coupled to an output converter and has a switch. The method also includes monitoring the bus voltage using voltage sensing circuitry and determining whether the voltage on the bus exceeds a threshold. If the voltage exceeds a threshold, the switch is turned off.

20 Claims, 7 Drawing Sheets

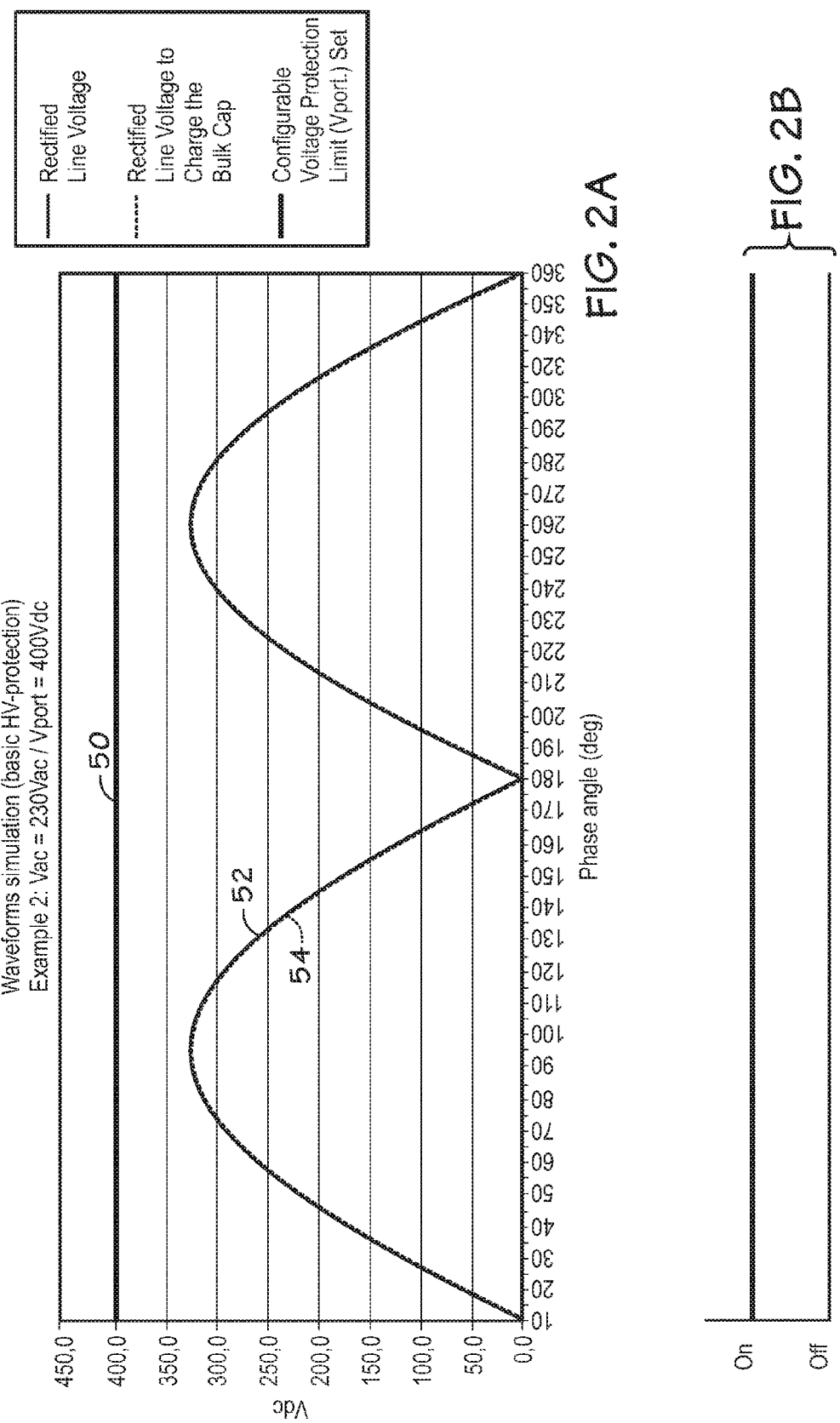

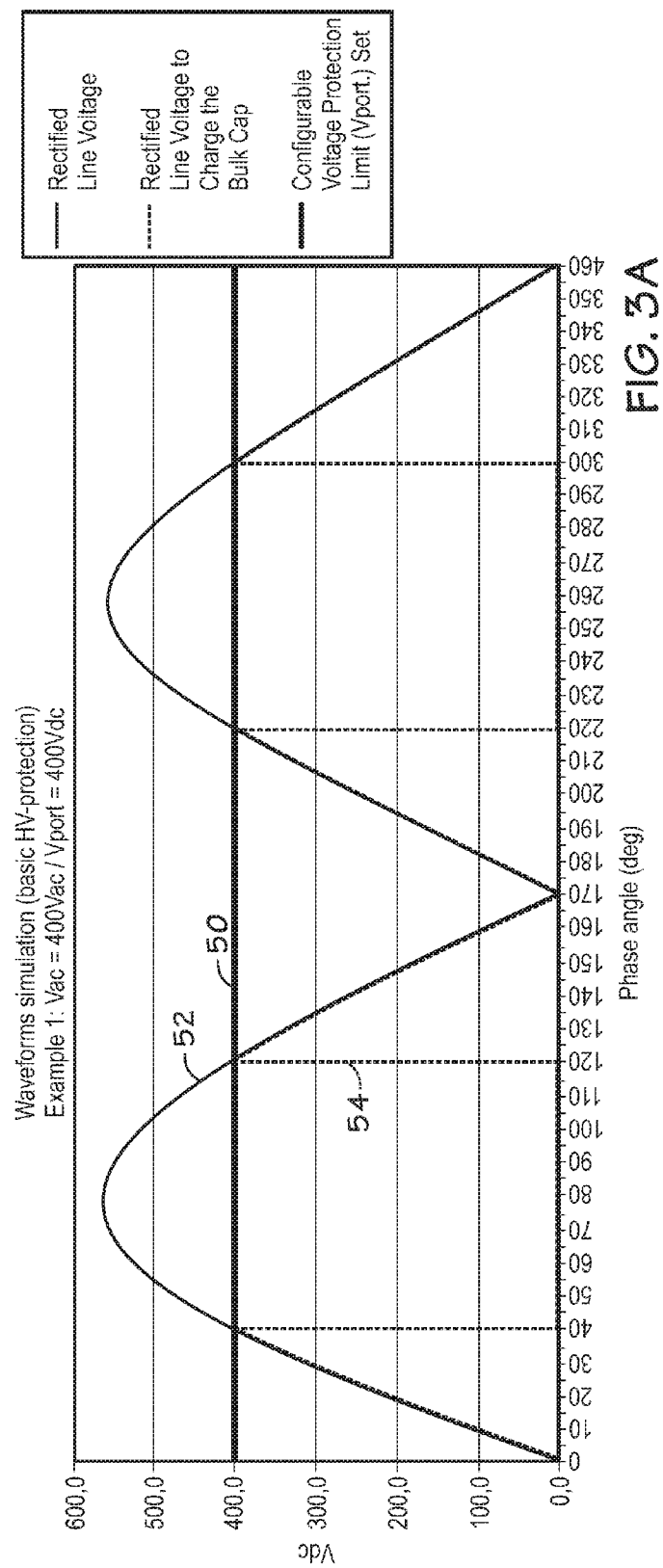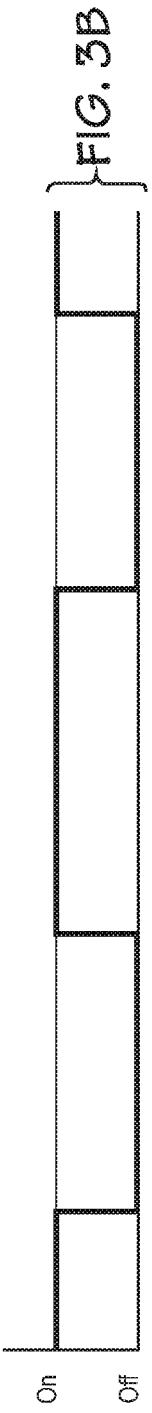
FIG. 3A
FIG. 3B

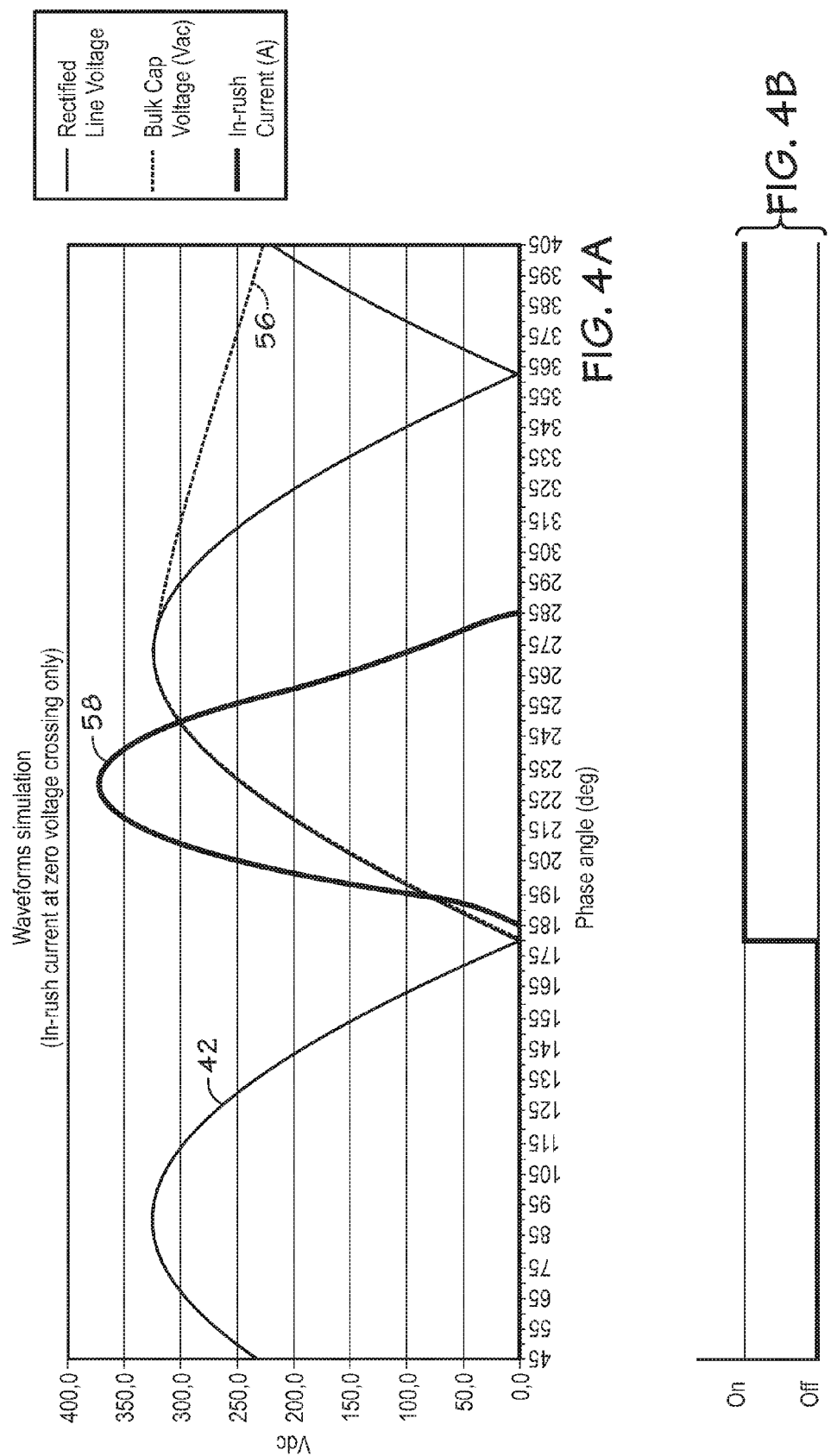

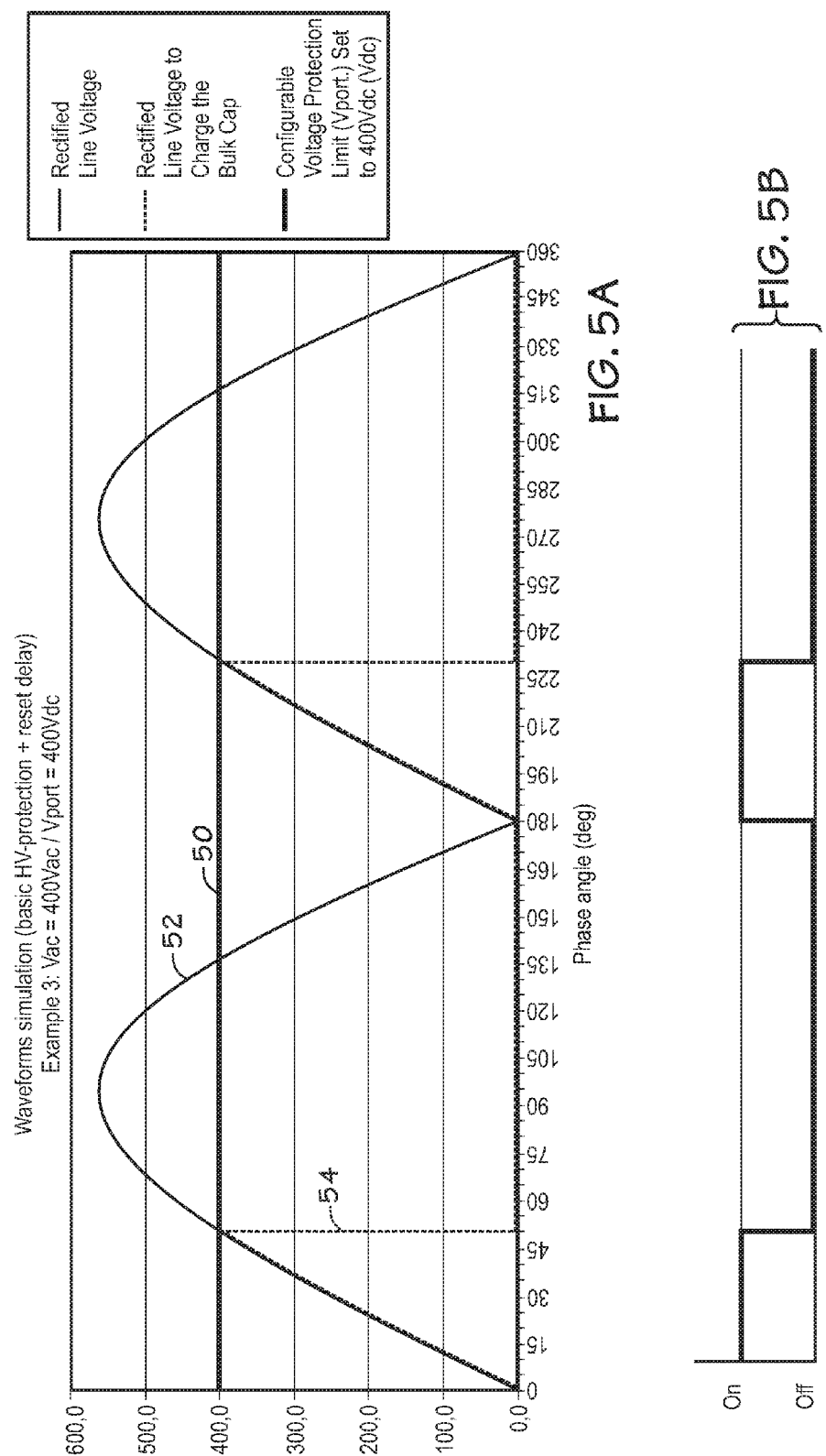

METHOD AND APPARATUS FOR A POWER CONVERSION DEVICE

TECHNICAL FIELD

The present invention relates to power conversion devices.

BACKGROUND

This section is intended to introduce the reader to various aspects of art, which may be related to various aspects of the present invention that are described and claimed below. This discussion is believed to be helpful in providing the reader with background information to facilitate a better understanding of the various aspects of the present invention. Accordingly, it should be understood that these statements are to be read in this light, and not as admissions of prior art.

There are several places worldwide, such as Western Europe, the United States of America and Canada, for example, where public power networks are generally reliable. Specifically, the public power networks provide a line voltage that experiences little variance, and any variances that do occur typically result from environmental factors. However, in emerging markets, such as China and India, for example, there are known power network quality issues. In particular, line voltage variance in the form of high line voltages as much as two times the nominal line voltage may commonly occur. These high line voltage events may have durations of a few milliseconds up to several hours.

As electronic products are increasingly being shipped to the emerging markets, manufacturers are encountering increased warranty repair costs due to the power network quality issues. Specifically, the high line voltage events, even those lasting for only milliseconds, have been proven to pose reliability issues. Conventionally, techniques to improve immunity to high line voltage events include using higher voltage rated components and/or adding a passive power factor controller (PFC) choke. These components are not standard or common and, as such, are more expensive, resulting in increased manufacturing costs for the power supplies implementing these techniques. Additionally, adding a passive PFC choke significantly increases the weight of the device, resulting in increased freight costs. Furthermore, customization of the power supply segment makes it difficult to leverage volume cost advantages, and increases the supply chain complexity, cost, inventory, etc.

BRIEF DESCRIPTION OF THE DRAWINGS

FIG. 2A is a waveform illustrating operation of the power supply of FIG. 1 during normal line voltages in accordance with an exemplary embodiment of the present invention;

FIG. 2B is a timing diagram of the power switch corresponding to the waveform of FIG. 2A;

FIG. 3A is a waveform diagram illustrating operation of the power supply of FIG. 1 in protection mode in accordance with an exemplary embodiment of the present invention;

FIG. 3B is a timing diagram of the power switch corresponding to the waveform of FIG. 3A;

FIG. 4A is a waveform diagram illustrating the operation of the power supply of FIG. 1 during an inrush current event in accordance with an exemplary embodiment of the present invention;

FIG. 4B is a timing diagram of the switch corresponding to the waveform diagram of FIG. 4A; and FIG. 5A is a waveform diagram illustrating operation of the power supply of FIG. 1 in a reset delay mode in accordance with an exemplary embodiment of the present invention;

FIG. 5B is a timing diagram of the power switch corresponding to the waveform of FIG. 5A;

DETAILED DESCRIPTION OF SPECIFIC EMBODIMENTS

One or more specific embodiments of the present invention will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

As will be discussed in detail below, there is provided an apparatus and methods for a high line voltage tolerant power conversion device. The power conversion device provides protection against variable voltage events and continuity of operation of electronic devices. Additionally, the power conversion device may be used as a universal low cost solution because it uses standard components. The power conversion device may include a power switch coupled to a bus line between a rectifier circuit and a bulk capacitor. During normal operation, the power switch remains in a conduction state (on) unless the voltage on the bus exceeds a reference or threshold level. If the voltage exceeds the threshold level, the power switch turns off to prevent excessively high voltages from reaching the bulk capacitor and other components of electronic devices.

Figure 1A:
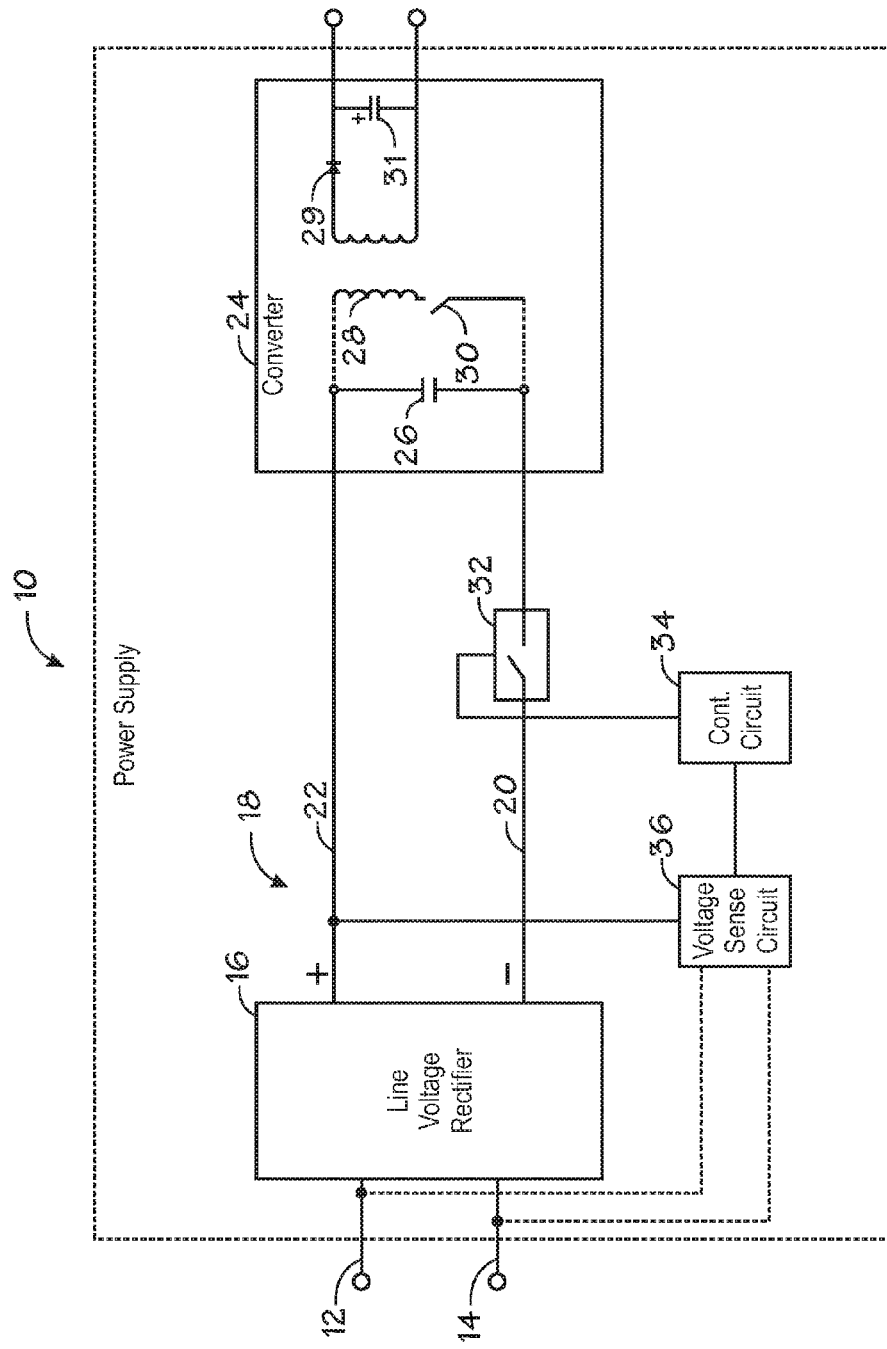
FIG. 1A illustrates a power supply in accordance with an exemplary embodiment of the present invention.

Referring to FIG. 1, a power conversion device, or power supply, is illustrated in accordance with an exemplary embodiment of the present invention and generally designated with the reference numeral 10. The power supply 10 has a line wire 12 and neutral wire 14 configured to couple into a grid power network or mains power. The line wire 12 and neutral wire 14 are coupled to a rectifier circuit 16 which converts a received alternating current (ac) from the grid power network to direct current (dc). The rectifier circuit 16 may be a bridge rectifier circuit common in the art configured to output a rectified voltage to a bus 18. The bus 18 has a negative line (−) 20 and a positive line (+) 22. The rectifier circuit 16 is coupled to an output converter 24 via the bus 18. The output converter 24 may be a dc-to-dc converter or a dc-to-ac converter depending on the specification requirements of the electronic device for which the power supply 10 is to be used. The output converter 24 may include a bulk capacitor 26 bridged between the negative and positive lines 20 and 22 of the bus 18. The bulk capacitor 26 is charged by the voltage on the bus 18. Additionally, the output converter 24 may have an inductor or transformer 28 and a switch 30. The bulk capacitor 26 helps to smooth the rectified line voltage 18. The switch 30 is used to transform the bus voltage 18 through the transformer 28 into the desired converter output voltage. An output rectifier diode 29 and an output filter capacitor 31 may also be provided. As will be understood by those skilled in the art, the shown converter 24 is given as an example and the techniques disclosed herein may be applied to work in all types of DC-AC or DC-DC converters.

As described above, power quality may vary significantly throughout the world. Currently, the highest continuous rectified line voltage value in the world is approximately 380Vdc (269Vac*√2). Power supplies may be configured to operate at that level without experiencing difficulty. However, in certain instances, this voltage may rise up to approximately 630Vdc due to power network faults. While power supplies connected to line voltages are designed to continuously operate within specification at the approximately 380 Vdc, they may be damaged due to operation for any length of time above the specified voltage.

In order to protect the power supply 10 against power network variances, such as high voltage events, and to provide continuous operation, a power switch 32 is provided on the bus 18 between the rectifier circuit 16 and the output converter 24 to control the exposure of the output converter 24 to high voltage events. The power switch 32 may be located on the negative bus line 20, as illustrated, or on the positive bus line 22. Alternatively, power switches may be redundantly located on both the positive and negative lines 20 and 22. The redundancy, however, increases cost as an additional switch is used. The power switch 32 may be an insulated gate bipolar transistor (IGBT), a bipolar transistor, a relay, a MOSFET, or any other suitable switch that provides a substantially instantaneous response. The particular type of switch selected may depend on system-related and business-related constraints, which may vary from one implementation to another.

The power switch 32 is in a conduction state (on) when a rectified line voltage on the bus 18 is within the determined operating limits for the power supply 10. For example, when the mains power network provides a rectified line voltage of 380Vdc or less, the power switch is on. As soon as the voltage on the bus 18 exceeds a threshold level, the power switch 32 is switched off to stop voltage from reaching the output converter 24.

To control operation of the power switch 32, a control circuit 34 is coupled to the power switch 32. The control circuit 34 may include logic made of one or more integrated circuits and/or discrete components. The integrated circuits may be analog, digital or mixed (both analog and digital). In one embodiment, the control circuit 34 may include a digital logic device, such as an application-specific integrated circuit (ASIC), configured to operate according to set parameters. Alternatively, as will be described in greater detail with respect to FIG. 1B, the control circuit 34 may include analog components selected and configured to operate within the parameters. The operating parameters for the switch 32 may include, for example, threshold levels that trigger actuation of the power switch 32. Additionally, the operating parameters may include a variety of modes for the operation of the control circuit 34. For example, the control circuit 34 may operate in a protection mode, an in-rush current mode, and/or a reset mode, among others. Several example modes are described in greater detail below.

The control circuit 34 may include a voltage detector having comparator circuitry, the drive circuitry for switch 32 and, depending on the options chosen for particular operating modes, additional optional circuitry. A voltage sense circuit provides the voltage information to a voltage detector, which detects whether the line voltage is within limits, as will be discussed in greater detail below. If the voltage detector detects that the line voltage is within determined limits for which the control circuit 34 has been programmed or designed switch 32 will remain in the on state. If the voltage detector detects that the line voltage is above the limits, a turn-off signal is provided to the drive circuit for switch 32 from the voltage detector. The drive circuit will turn switch 32 on again according to the particular operating mode of the control circuit 34. The control circuit 34 may operate with power drawn from the existing power supply circuitry or, alternatively, may include a low-power bias circuit.

Figure 1B:
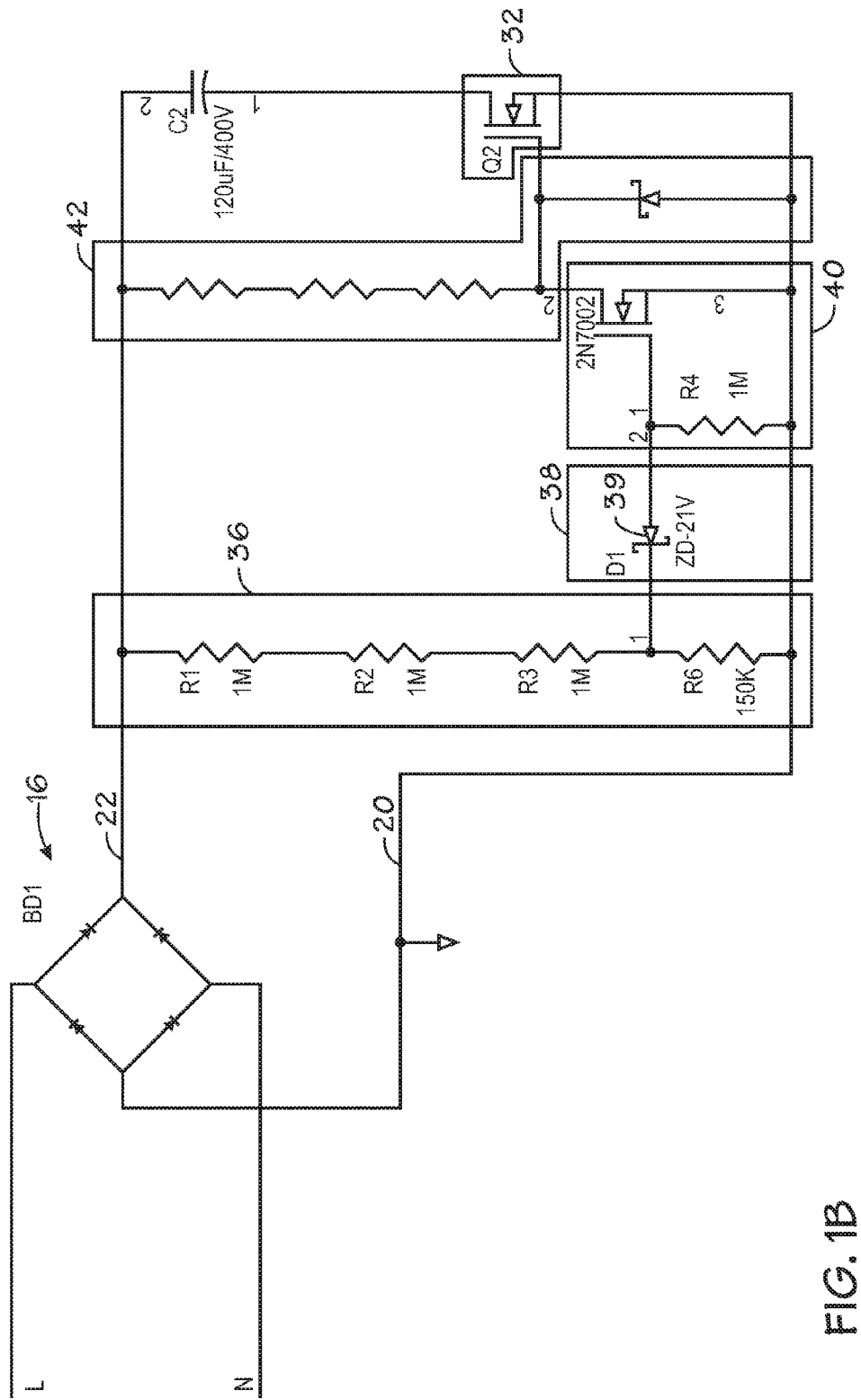
FIG. 1B illustrates voltage sensing circuitry and control circuitry of FIG. 1A in accordance with an exemplary embodiment of the present invention.

The modes of operation and the threshold levels may be customized by programming a logic block and/or by designing the control circuit 34 to provide the particular response characteristics. For example, FIG. 1B illustrates a schematic diagram of the control circuit 34 in accordance with an example embodiment of the present invention. As illustrated, the control circuit 34 of FIG. 2B includes a voltage sensing circuit 36. The voltage sensing circuit 36 may be coupled to the AC side (lines 12 and 14) or the DC side (line 22) of the line rectifier circuit 16. The voltage sensing circuit 36 may include serially coupled resistors configured as a voltage divider circuit relative to a voltage detector component 38. The voltage divider configuration allows for only a portion of the total voltage on the bus 18 to arrive at the voltage detector component 38. If the voltage sense circuit 36 is coupled to the AC side, a transformer, such as a small 50/60 HZ transformer (not shown) may step-down the voltage level to be supplied to the voltage detector. The voltage sensing circuit 36 indicates the voltage level of the bus 18 or AC-line to the control circuit 34 and the control circuit 34 controls the operation of the power switch 32 according to the operating parameters. The voltage sensing circuit 36 may also be used to provide a zero voltage crossing signal for the in-rush current mode operation.

The voltage detector component 38 may be a Zener diode 39, as shown in FIG. 1B. Alternative embodiments may include digital circuitry, or any other type of device configured to be sensitive to voltage levels. In the case of the Zener diode 39, the Zener diode 39 may be selected to have a reverse breakdown voltage that would indicate an over-voltage event occurring on the bus 18. As mentioned above, the voltage level provided to the voltage detector component 38 is only a portion of the total voltage on the bus 18 due to the voltage divider of the voltage sense circuit 36. Accordingly, the voltage divider of the voltage sense circuitry 36 may be configured so that the amount of voltage provided to the Zener diode 39 in an over-voltage event would coincide with the reverse breakdown voltage of the Zener diode 39.

As mentioned above, the control circuit 34 may also be configured to provide a bias voltage to the power switch 32 and to act as the switch driver. Accordingly, a drive circuit 40 and a bias circuit 42 may be included with the control circuit 34. The bias circuit 42 provides energy to turn on the power switch 32 while the drive circuit 40 controls the turning on and off of the power switch 32 based on the information received from the voltage detector 38. FIG. 1B illustrates an example of a drive and bias circuit.

Protection Mode

Turning to FIG. 2A, a waveform simulation illustrating normal operation of the power supply 10 is shown. The vertical axis represents dc voltage and the horizontal axis represents the phase angle in degrees. A threshold level 50 is set at 400 Vdc and a rectified line voltage 52 at the output of the rectifier circuit 16 is shown. Additionally, the rectified line voltage 54 supplied to the bulk capacitor 26 is shown mirroring the rectified line voltage 52. FIG. 2B illustrates a timing diagram of the power switch 32 corresponding, to the waveform simulation of FIG. 2A. Because the rectified line voltage 52 never exceeds the threshold level 50, the switch 32 remains in a conduction state, allowing the rectified line 54 voltage to be supplied to the bulk capacitor 26.

Referring to FIG. 3A, a waveform simulation of the rectified line voltage 54 which charges the bulk capacitor 26 is illustrated during a high voltage event. Specifically, as can be seen, the rectified line voltage 52 output by the rectifier circuit 16 exceeds the threshold level 50 at a phase angle of about 50 degrees. Because the rectified line voltage 52 has exceeded the threshold level 50, the power switch 32 is turned off. The power switch 32 remains off while line voltage 44 exceeds the threshold level, as shown in FIG. 3B. As such, the capacitor 26 never is exposed to voltages above the threshold 50, keeping the bulk capacitor 26 voltage equal to or below the reference voltage level 50 and, thus, providing protection to the bulk capacitor 26 and other components receiving power from the power supply 10.

Additionally, because the power switch 32 is able to react substantially instantaneously, as soon as the control circuit 34 indicates that voltage on the bus 18 exceeds the threshold 50, the switch 32 is opened. While the switch 32 is open, the capacitor 26 continues to supply an output voltage as its charge decays, thus providing continuous operation of the power supply 10.

As soon as the rectified line voltage 52 on the bus 18 crosses the defined threshold level 50 again, and is below the threshold level 50, the switch 32 is turned on. As the AC-line is alternating and the waveform is approximately sinusoidal, in the event of a high line voltage event, the rectified line voltage 52 crosses the threshold level 50 twice per half line cycle, the power switch 32 will turn off and on once per half line cycle, recharging the bulk capacitor 26 a maximum of two times per half line cycle.

Additionally, the power switch 32 is generally not exposed to high voltage levels, thus, a low-cost switch may be used. Specifically, while the power switch 32 is in the off state, the power switch 32 is only exposed to the difference between the capacitor 26 voltage level and the voltage level on the bus 18. As such, the maximum voltage the power switch 32 is expected to see once the power supply 10 is turned on, in the case of an abnormal high line voltage condition is approximately 250Vdc. When the power supply 10 is initially connected into the mains power network experiencing an abnormally high line voltage, however, the maximum voltage level to which the power switch 32 may be exposed is approximately 630Vdc because the capacitor 26 is not initially charged. One technique to minimize the high voltage exposure when the power supply 10 is first turned on is discussed in greater detail below with reference to FIG. 4. Regardless, however, any exposure to the high voltage is for less than ⅛ the duration of a line cycle and only once during start up, thus allowing a standard switch, such as a low cost MOSFET, for example, to function as the power switch 32.

In-Rush Current Mode

As mentioned above, techniques may be implemented to minimize exposure to high voltage levels when the power supply 10 is initially turned on. In-rush current generally occurs when initially applying a line voltage to a power supply. The in-rush current is typically greatest at the peak of the sinusoidal waveform of the line voltage and can be significantly higher than when starting at zero volts. The effects of the in-rush current may be minimized by timing the turning on of the switch 32 so that the in-rush peak does not coincide with the peak voltage of the rectified voltage from the rectifier circuit 16. To do this, the switch 32 remains off until the rectified voltage from the rectified circuit 16 reaches zero volts.

Referring to FIG. 4A, a waveform simulation of a bulk capacitor voltage 56 is shown during an in-rush current event. As can be seen in FIG. 4B, the switch 32 is off until the rectified line voltage 52 output by the rectified circuit 16 reaches zero volts (at 180 degrees). The switch 32 is then turned on and an in-rush current 58 occurs. Because the switch was not turned on until the rectified line voltage 52 reached zero volts, the in-rush current 58 reaches a maximum and begins to decrease before the rectified line voltage 52 reaches a maximum. By the time the bulk capacitor 26 is fully charged by the rectified line voltage 52, the in-rush current 58 has nearly completely dissipated. The charge in the capacitor 26 slowly begins to decay as the rectified line voltage 52 returns to zero volts. Thus, the effects of the in-rush current 58 do not adversely affect the capacitor 26 and other components coupled to the power supply.

Reset or Delay Mode

The controller circuit 34 may be configured to operate in a reset or delay mode allowing for a greater period for discharging the capacitor 26 than in the previously discussed modes. Referring to FIG. 5A, a waveform illustrating the rectified line voltage 52 to charge the bulk capacitor 26 when the logic device is set to operate in a reset or delay mode is illustrated. As with the rectified line voltage illustrated in FIG. 3A, the rectified line voltage 52 surpasses the threshold level 50 at a phase angle of 50 degrees, for example. When this occurs, the power switch 32 turns off, as shown in FIG. 5B. However, because the logic device has been set to operate in a reset or delay mode, the power switch 32 remains off until the rectified line voltage 52 reaches zero volts, which may be considered a second threshold. Indeed, the logic device may be configured to turn on the switch 32 when the rectified line voltage 52 reaches any voltage level which is less than the first threshold 50, but equal to or greater than zero volts. The logic device of the control circuit 34 may be configured as well to turn on again only after time interval or defined number of line cycles provided the fact that line voltage at the moment of turn on is below the protection threshold level. Once the rectified line voltage 52 reaches the second threshold voltage level, the switch 32 is returned to conduction mode and the rectified line voltage 52 charges the bulk capacitor 54. As such, the reset or delay mode allows for the turn off period for the power switch 32 to be set as per a particular application's requirements.

In each of the aforementioned embodiments and the associated operating modes, the threshold level 50 may be set to any level according to the operating parameters of a particular power supply by simply programming the voltage detector in the control circuitry 34 to the desired threshold level 50. As such, the power supply 10 can be configured to operate in one or more various modes to provide protection against particular high voltage events to which the power supply may be exposed.

Figure 6:
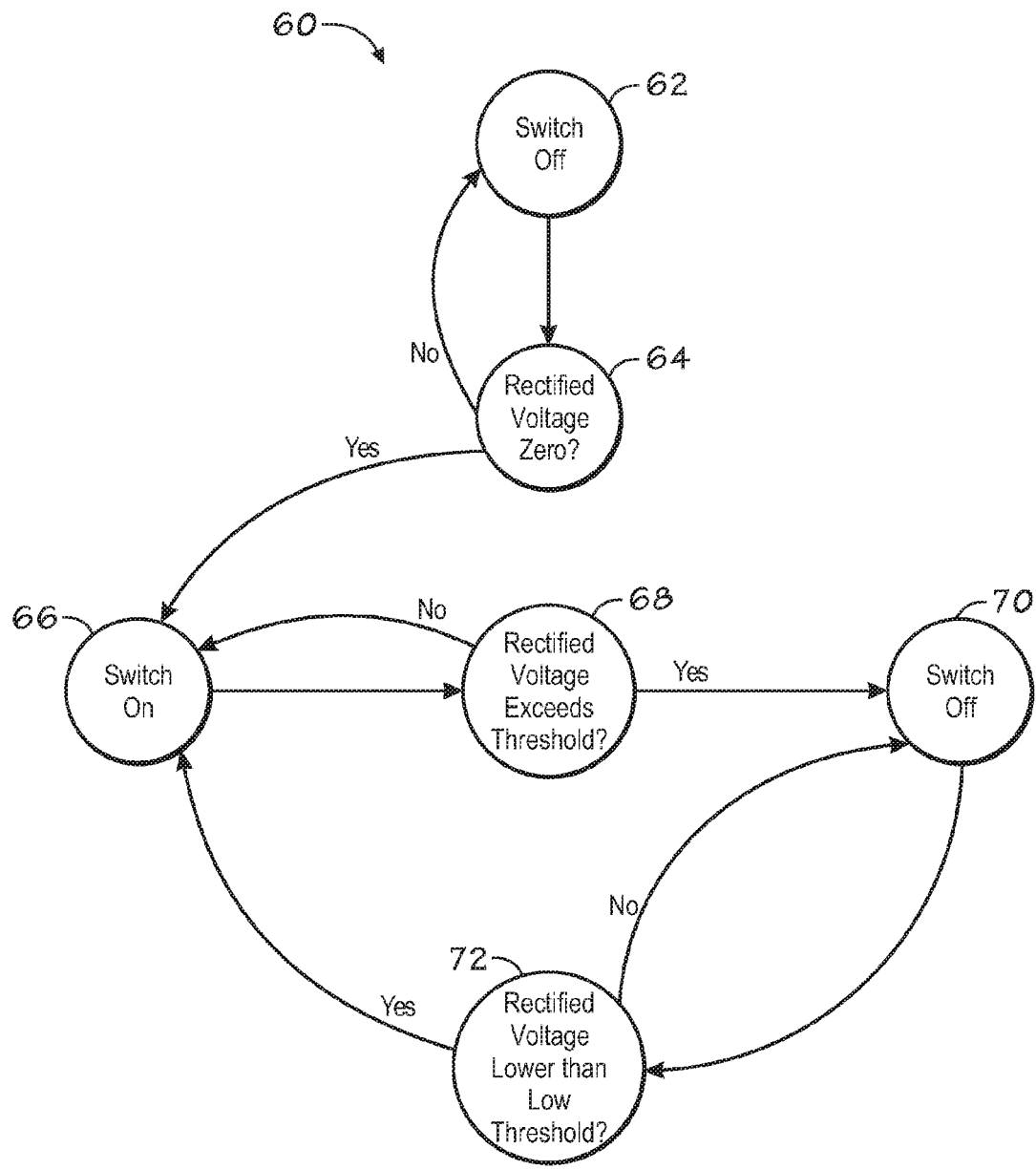
FIG. 6 is a state diagram illustrating the operation of the switch of FIG. 1 in accordance with an embodiment of the present invention.

Indeed, the above mentioned modes of operation may be implemented independently or in combination. For example, FIG. 6 is a state diagram 60 illustrating the operation of the power switch 32 configured to operate in at least two of the above-described modes in accordance with an exemplary embodiment. The state diagram 60 begins with the switch 32 being off, as indicated by state 62, to provide in-rush current protection, as discussed above. The controller circuit 34 determines when the rectified voltage 52 is zero, as indicated at state 64. Initially, while the rectified voltage 52 is greater than zero, the switch 32 remains in an off state. When the rectified voltage 52 reaches zero volts, the switch 32 moves into an on state, as indicated at block 66. Once in the on state, the switch 32 remains on (in a conduction state) if the rectified voltage 52 on the bus 18 sensed by the voltage sensing circuitry is below the threshold level 50. As mentioned above, the threshold level 50 may be set to any voltage level and may be determined based on operating specifications and parameters of the electronic devices for which the power supply 20 is to be used.

The control circuit 34 determines if the rectified voltage 52 exceeds the threshold 50, as indicated at state 68. The switch 32 moves into an off state, as indicated by block 70, when the threshold 50 is exceeded. The switch 32 remains in an off state until the rectified voltage 52 is lower than a second threshold level, as indicated by state 72. The second threshold level may be, for example, when the rectified voltage reaches zero volts in a reset mode (FIGS. 5A-B) or when the voltage again crosses the first threshold 50 in the protection mode (FIGS. 3A-B), for example, as discussed above. In either case, once the second threshold is exceeded, the switch 32 returns to the on state, as indicated by block 66.

It is expected that power losses attributable to the power switch 32 are expected to be very low while operating in normal conditions (always on). Specifically, no switching losses and very low conduction losses are seen only in the bulk capacitor 26 charge current during normal operation. Initial tests performed on a 65 W power supply at 120Vac showed approximately 0.5 W losses or 0.7%. Thus, the protection circuit provided by the power supply 10 provides an energy efficient solution. Additionally, to increase the energy efficiency of the power supply in low power modes, the power switch 32 may be configured to further enhance energy efficiency in low power modes by turning off periodically to interrupt line current drawn by the bulk capacitor 26 and components connected in parallel to the bulk capacitor 26. In order to customize the power supply's operating parameters, only the logic block of the controller circuit 34 need be modified.

The systems and methods disclosed in detail herein provide several advantages over the solutions currently being implemented. The present system and methods provide 100% survival protection and continuous operation of the system regardless of the duration of the event. Additionally, the system may use common industry standard components that do not significantly increase the weight of the power supply, thus providing a significant cost reduction to existing solutions in both component costs (approximately three times less expensive than alternative solutions) and freight costs. Moreover, because the system and methods may be universally applied to power supplies, a worldwide implementation is possible resulting in a simplified supply chain and volume shipment benefits.

While the invention described above may be susceptible to various modifications and alternative forms, specific embodiments have been shown by way of example in the drawings and have been described in detail herein. It should be understood, however, that the invention is not intended to be limited to the particular embodiments disclosed.

What is claimed is:

1. A method for operating a power conversion device comprising:
    activating the power conversion device, wherein activating the power conversion device comprises turning on the power conversion device and turning off a switch in the power conversion device;
    then rectifying a grid voltage to produce a rectified voltage comprising a dc voltage;
    placing the rectified voltage on a bus coupled to an output converter, the bus having the switch located on at least one line of the bus;
    monitoring the rectified voltage using voltage sensing circuitry, the switch remaining off until the rectified voltage reaches zero volts;
    turning the switch on when the rectified voltage reaches zero volts;
    maintaining the switch in the on state during operation of the device until it is determined that the rectified voltage exceeds a first threshold, the first threshold indicating an excessive voltage level that poses a threat of damage to a bulk capacitor in the output converter; and
    turning the switch off when the rectified voltage exceeds the first threshold.

2. The method of claim 1 comprising turning the switch on once the rectified voltage returns below the first threshold.

3. The method of claim 1 comprising turning the switch on once the rectified voltage reaches a second threshold.

4. The method of claim 3, wherein the second threshold is between the first threshold and zero volts.

5. A device comprising:
    a rectifier circuit configured to receive a main line voltage and provide a rectified voltage to a bus;
    a converter coupled to the bus being configured to provide a converted output voltage based on the rectified voltage; and
    a switch located on the bus, the switch being coupled to controller circuitry, wherein the controller circuitry is to:
        turn off the switch when the device is activated;
        turn on the switch when the rectified voltage reaches zero volts; and
        leave the switch turned on until the rectified voltage exceeds a threshold, the threshold indicating an abnormally high line voltage.

6. The device of claim 5 comprising voltage sensing circuitry coupled to the controller circuitry and configured to determine a level of the rectified voltage on the bus.

7. The device of claim 5, wherein the controller circuitry comprises a logic block configured to determine when to place the switch in an on state or an off state according to operating specifications for the device.

8. The device of claim 7, wherein the controller circuitry comprises a switch driver controlled by the logic block and configured to provide a bias voltage to the switch.

9. The device of claim 5, wherein the converter comprises a dc-to-dc converter.

10. The device of claim 5, in which turning on the switch when the rectified voltage reaches zero volts produces a maximum startup in-rush current before the rectified line voltage reaches a maximum.

11. The device of claim 6, in which the controller circuitry comprises an application specific integrated circuit (ASIC).

12. The device of claim 6, in which the controller circuitry comprises comparator circuitry and drive circuitry for the switch.

13. The device of claim 6, in which the controller circuit operates from power drawn from the rectifier circuit.

14. The device of claim 6, in which the controller circuit operates from a low-power bias circuit.

15. The device of claim 5, further comprising a voltage sensing circuit connected to an AC side of the rectifier circuit.

16. The device of claim 5, further comprising a voltage sensing circuit connected to a DC side of rectifier circuit.

17. The device of claim 5, further comprising a voltage sensing circuit comprising:
    a voltage divider; and
    a Zener diode selected with a reverse breakdown voltage that indicates an over voltage event.

18. The device of claim 5, in which the switch is exposed to a voltage difference between a bulk capacitor charge level and a voltage level on the bus.

19. The device of claim 5, in which the switch is a metal-oxide-semiconductor field-effect transistor (MOSFET).

20. A power conversion device comprising:
- a rectifier circuit to receive a mainline voltage and produce a rectified voltage;
- a dc-to-dc converter to receive the rectified voltage and produce a converted output voltage;
- a bus connecting the rectifier circuit and the converter and conducting the rectified voltage from the rectifier circuit to the converter;
- a MOSFET switch located on the bus, in which the switch is exposed to the voltage difference between the bulk capacitor charge level and the voltage level on the bus;
- voltage sensing circuitry comprising a voltage divider and a Zener diode connected to the voltage divider such that the reverse breakdown voltage of the Zener diode is exceeded when an abnormal high voltage event occurs;
- ASIC controller circuitry to receive an output of the voltage sensing circuitry and to:
  - operate in an in-rush mode comprising:
    - turning off the switch when the device is activated; and
    - turning on the switch when the rectified voltage reaches zero volts to produce a maximum startup in-rush current before the rectified line voltage reaches a maximum; and
  - operate in a protection mode comprising:
    - leaving the switch turned on until the rectified voltage exceeds a threshold, the threshold indicating an abnormally high line voltage that is damaging to components in the converter;
    - turning the switch off when the rectified voltage exceeds the threshold; and
    - turning the switch back on when the rectified voltage is lower than the threshold.

* * * * *